United States Patent [19]

Knoski

[11] 4,231,670

[45] Nov. 4, 1980

[54] EASY CHANGE WHEEL ASSEMBLY

[76] Inventor: Jerry L. Knoski, 1695 Emerald Ct., Newark, Ohio 43055

[21] Appl. No.: 20,302

[22] Filed: Mar. 14, 1979

[51] Int. Cl.³ .............................................. F16D 1/00
[52] U.S. Cl. ....................................... 403/11; 403/13; 403/324; 403/355; 403/361; 301/121; 474/902
[58] Field of Search ............... 403/106, 109, 306, 355, 403/361, 11, 13, 324; 301/1, 9 S, 111, 112, 113, 114, 120, 121, 122, 9, 9 DN, 9 DP; 74/230.01, 548, 813 R, 813 L; 269/69, 70

[56] References Cited

U.S. PATENT DOCUMENTS

| | | | |
|---|---|---|---|
| 1,118,495 | 11/1914 | Kelly | 301/9 S |
| 2,619,389 | 11/1952 | James | 301/1 |
| 2,640,729 | 6/1953 | Niven | 301/9 DN |
| 3,844,666 | 10/1974 | Coope | 403/355 |

Primary Examiner—H. Grant Skaggs

Attorney, Agent, or Firm—Joseph E. Rusz; Arsen Tashjian

[57] ABSTRACT

A wheel assembly adaptable for use with a motor vehicle, a light aircraft, and the like, or in a pulley system or gear train. The wheel assembly comprises an axle or spindle-retained hub member, and a removable wheel member that is releasably connected by unique snap-/lock pins. The hub member is made of a more dense material than the material of which the wheel member is made. In the adaption for use with a motor vehicle, light aircraft, and the like, the wheel member (with a tire mounted on it) is significantly lighter than the conventional rim-mounted tire, because of the absence of the hub portion; and, therefore, the wheel member can be easily changed or removed by even the weak, the aged, and the handicapped. Additionally, because the customary bolt/nut or lug/lug nut fastening combinations are not used, the wheel member is easy to change or remove, and, as importantly, the need for a "lug wrench" is eliminated.

4 Claims, 5 Drawing Figures

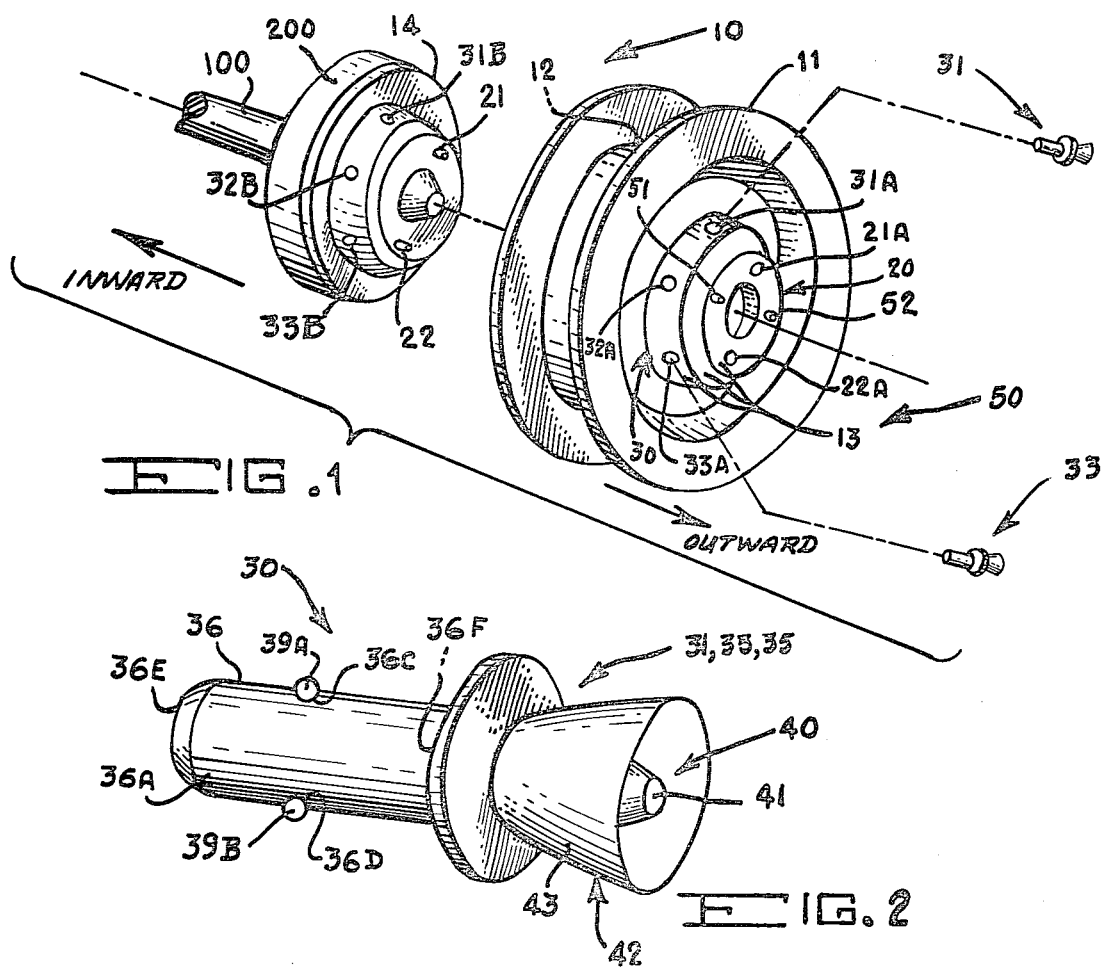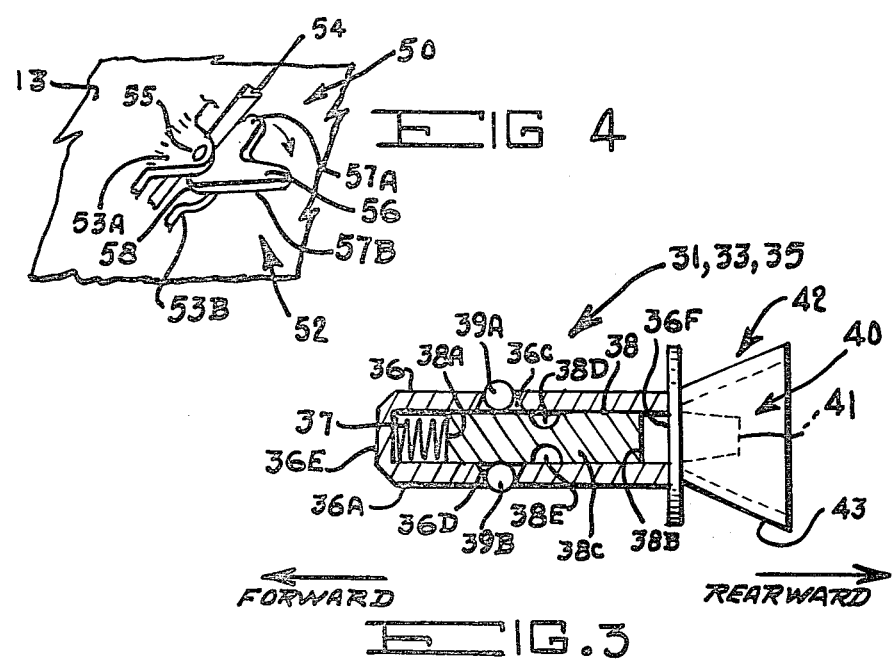

EASY CHANGE WHEEL ASSEMBLY

STATEMENT OF GOVERNMENT INTEREST

The invention described herein may be manufactured and used by or for the Government for governmental purposes without the payment of any royalty thereon.

BACKGROUND OF THE INVENTION

This invention relates, generally, to the rotor (e.g., wheel, pulley, gear, and the like) and the axle (e.g., spindle, pin or the like) more particularly, to a detachable (i.e., demountable) wheel for a vehicle.

The prior art method of mounting detachable or demountable wheels on the axle of an automobile, or other vehicle (such as a light aircraft), includes the step of tightening threaded nuts on axle-retained (or brake down-retained, or brake-disk retained) threaded studs or bolts, to assure both that the wheels are securely mounted, and also that the wheels do not wobble. The tendency is to overtighten for an added measure of security. This problem of overtightening is compounded with the advent of power driven impact tools which are used in garages and service stations to speed up the wheel change process. The net effect is that most nuts are fastened so tightly to the studs that they cannot be loosened by the aged, the handicapped, and (as has been ascertained, by the military services and by commercial utility companies) by the average female. As importantly, the well known reluctance of most service stations to provide roadside assistance, further adversely compounds the situation by placing these individuals in jeopardy.

By my invention I have eliminated, or at least minimized, the above-mentioned problems; and, thereby I have significantly advanced the state-of-the-art.

SUMMARY OF THE INVENTION

My invention pertains to a two-piece, snap/lock pin releasably connected wheel assembly, which, in its preferred embodiment for the particular adaption as a demountable wheel assembly for a vehicle with a tire (not shown) mounted on the wheel member, permits the very easy removal and/or change of the lighter wheel member from the heavier, axle-retained hub member by almost anyone (including the weak, the handicapped, and the aged) from the vehicular axle which, as previously indicated, retains the heavier hub member of the wheel assembly. It is strongly emphasized hereat: that this particular adaption is solely by means of illustration, and not by way of any limitation; and, that the basic and fundamental features of my wheel assembly may be incorporated into pulleys systems, gear trains, and the like.

Accordingly, the principal object of this invention is to teach the structure of my above-described novel wheel assembly, by providing a preferred embodiment thereof.

This principal object, as well as related objects, of this invention will become readily apparent after a consideration of the description of the invention, together with reference to the Figures of the drawings.

DESCRIPTION OF THE DRAWINGS

FIG. 1 is an exploded view of a preferred embodiment of the two-piece inventive wheel assembly, in perspective, partially schematic in simplified form, showing the invention in its working environment;

FIG. 2 is a perspective view, in simplified form, of the exterior of a representative one of the plurality of my invention snap/lock pins that are used to releasably connect my wheel member to my hub member;

FIG. 3 is a side elevation view, in cross section and in simplified schematic form, of the representative snap/lock pin shown in FIG. 2, but not to scale;

FIG. 4 is a perspective view, partially fragmented and partially in schematic form, of a portion of my unique means for breaking any seals that may develop between my outer wheel member and my inner hub member when they are in abutting contact and releasably connected.

DESCRIPTION OF THE PREFERRED EMBODIMENT

Figure 5:
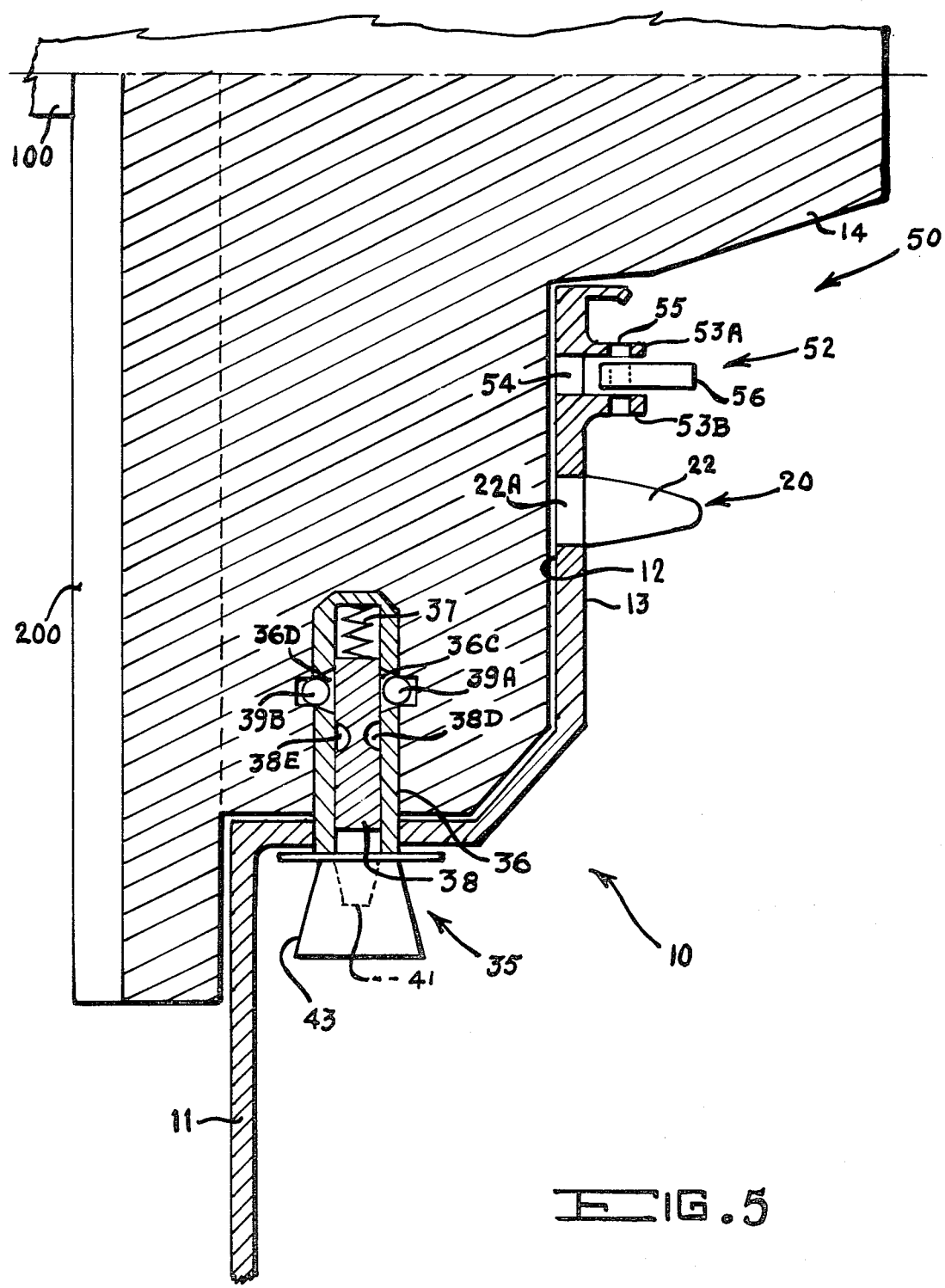
FIG. 5 is a side elevation view, partially in cross section, partially fragmented, and partially in schematic form, of the lower portion of my wheel member and my hub member in abutting contact and releasably connected.

With reference to FIGS. 1 and 5 therein is shown the preferred embodiment 10 of my inventive easy change wheel assembly.

In the most basic and generic structural form, the assembly 10, which is for use with an axle or the like (such as 100, FIG. 1), comprises:

a. a wheel member 11 having an inner hollow hub portion 12 and an outer protruding hub portion 13;

b. a hub member 14 that is configured and dimensioned to fit into, and to complement with, the inner hollow hub portion 12 of the wheel member 11, with the hub member 14 connected (by suitable means, such as adapter 200, FIG. 1), for rotatable motion, to the axle or spindle or the like 100, FIG. 1;

c. means, generally designated 20, for guiding the inner 12 and outer 13 portions of the wheel member 11 over and onto the hub member 14, with the hub member 14 guided into, removably positioned within, and abutting with the inner hollow hub portion 12 of the wheel member 11;

d. means, generally designated 30, for releasably connecting the wheel member 11 and the hub member 14;

e. and, means, generally designated 50, for breaking a seal that may develop between the inner hollow hub portion 12 of the wheel member 11 and the abutting hub member 14, as a result of releasably connecting the wheel member 11 and the hub member 14 with the releasable connecting means 30.

More specifically, the means 20 for guiding the hub portions 12 and 13 of the wheel member 11 over and onto the hub member 14 preferably includes: a plurality of guide pins, such as 21 and 22, that project outwardly from the outer surface of the hub member 14; and a plurality of corresponding complementary guide pin holes, such as 21 A and 22 A, with of course there being one such guide pin hole for each guide pin (e.g., guide pin hole 21A for a guide pin 21), in and through the outer protruding hub portion 13 of the wheel member 11. Each guide pin is tapered outwardly; and, as a matter of preference, there are two such guide pins (i.e., 21 and 22) and they are disposed in mutually opposed spaced-apart relationship, as shown in FIG. 1.

Additionally, and more specifically, the means 30 for releasably connecting the wheel member 11 and the hub member 14 preferably includes; a plurality of snap/lock pins, such as 31 and 33; a first plurality of corresponding complementary snap/lock pin holes, such as 31A, 32A and 33A, with of course there being one such snap/lock pin hole for each snap/lock pin (e.g., holes 31A and 33A for, respectively, snap/lock pins 31 and 33), in the outer protruding hub portion 13 of the wheel member 11; and, a second plurality of corresponding complementary snap/lock pin holes, such as 31B, 32B and 33B, with one such snap/lock pin hole for each snap/lock pin (e.g., holes 31B and 33B for, respectively for snap/lock pins 31 and 33), in the hub member 14, with the corresponding first and second plurality of holes, such as 31A and 31B. in registration when the hub member 14 and the wheel member 11 are abutting and/or are releasably connected.

Also as a matter of preference, and with reference to FIGS. 2 and 3, each one of the plurality of snap/lock pins (such as 31, FIGS. 1, 2 and 3; and 33, FIG. 1; and 35, FIG. 5) is identical and preferably comprises, as does representative snap/lock pin 31, the following, wherein the same reference numerals of constutient elements are used as to all of the snap/lock pins:

a. a hollow, essentially cylinder-shaped member 36 having a cylindrical surface 36A with a plurality of holes therein, such as 36C and 36D, and closed base end 36E, and an open base end 36F, FIG. 3; and b. a spring 37, FIG. 3, that is disposed within the hollow, cylinder-shaped member 36, with the spring 37 abutting the closed base end 36E of the hollow, cylinder-shaped member 36; and c. a center shaft 38, FIG. 3, that is disposed within the hollow, cylinder-shaped member and having a first end 38A, a second end 38B, and a body portion 38C (between the ends 38A and 38B) with a plurality of hemispherically-configured cavities, such as 38D and 38E, with a cavity for each corresponding hole, such as 36C and 36D, that is in the cylindrical surface 36A of the cylinder-shaped member 36, and with each of the cavities disposed rearward of its corresponding hole (e.g., cavity 38D is rearward of hole 36C) when the center shaft 38 is rearwardly (i.e., inactively) positioned, as shown in FIG. 3, and also with the center shaft 38 so disposed that it abuts the spring 37 with its first end 38A and also simultaneously abuts the cylinder-shaped member 36 with its body portion (i.e., surface) 38C; and d. a plurality of ball bearings, such as 39A and 39B, with one ball bearing for each hole, such as 36C and 36D, in the cylindrical surface 36A of the cylinder-shaped member 36, with the ball bearing selectively capturable within, and between the holes in the cylindrical surface of cylinder-shaped member 36 and the corresponding cavities in the body portion of the center shaft 38; and e. a push button means, generally designated 40, for selectively urging and moving the center shaft 38 slidably forward and rearward within the cylinder-shaped member 36, with this means 40 disposed at the second end 38B of the center shaft 38 and in contact with it, and with this means 40 including a push button actuating member 41; and f. and, means, generally designated 42, for grasping and holding the (and, of course, "each") snap/lock pin, such as 31, with this means 42 integrated with the cylinder-shaped member 36 and further including a fingergrip 43 that is, preferably, in the shape of an inverted frustum of a cone that is disposed near, and is offixed to the open end portion 36F of the cylinder-shaped member 36 of the snap lock pin, with the frustum of the cone surrounding, and extending beyond, the push button actuating member 41 of the push button means.

Further, and more specifically, the means 50 for breaking any seal that develops between the inner hollow hub portion 12 of the wheel member and the outer surface of the abutting hub member 14 preferably includes a plurality of break-seal subassemblies, such as 51, FIG. 1, and 52 FIGS. 1, 4 and 5, that are identical. Each break-seal subassembly preferably comprises, as does representative one 52, FIGS. 1, 4 and 5, the following:

a. a pair of pivot pin holders, such as 53A and 53B, aligned with each other and in equal speed-apart relationship, with the pin holders affixed to the outer protruding hub portion 13 of the wheel member 10;

b. a slot 54, in and through the outer protruding hub portion 13 of the wheel member 11, with the slot 54 located between the pair of pivot pin holders 53A and 53B; and c. a rotatable pivot pin 55 connected to, and interconnecting, the pivot pin holders 53A and 53B; and d. a "V"-shaped liner member 56 having converging legs 57A and 57B that intersect at an apex 58, with the lever 56 pivotally mounted on the pivot pin 55 and dispursed opposite the slot 54, and with the apex 58 of the lever 56 selectively movable into and out of the slot 54, and also with the lever 56 so dimensioned that, when the apex 58 is moved into the slot 54, the apex 58 contacts, urges, and moves the abutting hub member 14 away from the inner hub portion 12 of the wheel number 11. As a matter of preference, and not of limitation, the break-seal subassemblies are two in number, and are disposed in mutually opposed spaced-apart relationship.

It is here to be noted that if, in fact, the wheel assembly 10 is to be used with a vehicle (such as an automobile or a lightweight aircraft), rather than in a pulley system or gear train, then I prefer that the wheel member be made of a lightweight material (such as one of the reinforced plastics), as compared to the material of which the hub member is made. More specifically, I prefer that the hub member be made of a more dense material (such as metal). I also prefer, in this situation, that the wheel member and the hub member be so dimensioned with relationship to each other that the hub member, because of the more dense material from which it is made, is significantly heavier than the wheel member.

MANNER OF OPERATION AND OF USE OF THE INVENTION

The manner of operation and of use of my inventive assembly 10 can be easily ascertained by any person of ordinary skill in the art from the foregoing description, coupled with reference to the Figures of the drawings.

For others, the following explanation is made:

Firstly, the hub member 14 is connected for rotatable motion, on the axis or spindle or pin or the like on which the assembly 10, as an integrated unit, is to be mounted for rotatable motion.

Then, the wheel member 11 (with a tire mounted on it, if the assembly 10 is to be used for rotatable motion on a vehicle) is guided over and onto the hub member 14, by use of the guide pins 21 and 22 and the corresponding complementary guide pin holes 21A and 22A, with the pins being inserted into the holes.

Next, each of the plurality of snap/lock pins, such as 31 and 33, is grasped by its fingergrip, such as 43, with the fingers; is inserted individually into its respective corresponding hole in both the outer protruding hub portion of the wheel member and in the hub member, which are in registration, such as 31A and 31B; and, its push button 41 is depressed. As a result, the center shaft 38 is selectively urged and moved slidably forward; the ball bearings, such as 39A and 39B, are, thereby, releasably captured within and between the holes, such as 36C and 36D (in the cylindrical surface 36A of the cylinder-shaped member 36 of the particular pin, such as 31) and the corresponding cavities, such as 38D and 38E (in the body portion 38C of the center shaft 38); the ball bearings then protrude from the holes; and, each snap/lock pin releasably locks the wheel member 11 to the hub member 14, in abutting contact.

To easily remove the wheel member from the hub, the "V"-shaped lever member, such as 56, of each break-seal subassembly, such as 51 and 52 is pivoted, so that the apex, such as 58, is moved into its respective slot, such as 54, with the apex 58 contacting, urging, and moving the abutting hub member 14 and the inner hub portion 12 of the wheel member 11 away from each other, thereby breaking any seal the that may have developed as a result of having releasably connected the wheel member 11 and the hub member 14 with the releasable connecting means 30, such as dirt, rust, and the like between the connected, and abutting, wheel member 11 and hub member 14. Then, the sequence set forth in the above next paragraph is reversed (including again depressing the push button 41 of each snap/lock pin), and the wheel member is very easily removed.

CONCLUSION

It is abundantly clear from all of the foregoing, and from the Figures of the drawings, that the desired principal object, as well as other related objects (e.g., if the wheel assembly 10 is used for an automobile, truck or the like, the need for a hub bolt/nut wrench, i.e., "lug wrench" or the like, is eliminated), of the invention have been achieved.

It is noted that, although these have been described and shown the fundamental and unique features of my invention as applied to a preferred embodiment adapted for a particular purpose, various other embodiments, variations, adaptations, substitutions, additions, omissions, and the like may occur to, and can be made by, those of ordinary skill in the art, without departing from the spirit of my invention. For example, the assembly 10, may be used with the spindle or the like (such as in a pulley system or a gear train) in a vertical position, rather than in the horizontal position in which the axle 100, and the assembly 10, are shown in FIG. 1.

What is claimed is:
1. A wheel assembly, for use in combination with an axle, comprising:
   a. a wheel member having an inner hollow hub portion and an outer protruding hub portion;
   b. a hub member configured and dimensioned to fit into and complement with said inner hollow hub portion of said wheel member, with said hub member connected, for rotatable motion, to an axle;
   c. means for guiding said hub portions of said wheel member over and onto said hub member, with said hub member guided into, removably positioned in, and abutting said inner hollow hub portion of said wheel member, wherein said guiding means includes:
      (1) a plurality of guide pins projecting outwardly from said hub member;
      (2) and, a plurality of corresponding complementary guide pin holes, with one said hole for each said guide pin, and with said guide pin holes disposed in and through said outer protruding hub portion of said wheel member, and into which said guide pin holes are inserted said guide pins;
   d. means for releasably connecting said wheel member and said hub member, wherein this releasable connecting means includes:
      (1) a plurality of snap/lock pins, wherein each one of said plurality of snap/lock pins comprises:
         (a) a hollow, essentially cylinder-shaped member having a cylindrical surface with a plurality of holes therein, a closed base end, and an open base end;
         (b) a spring disposed within said hollow, cylinder-shaped member, with said spring abutting said closed base end of said hollow, cylinder-shaped member;
         (c) a center shaft disposed within said hollow, cylinder-shaped member and having a first end, a second end, and a body portion therebetween with a plurality of hemispherically-configurated cavities therein, with one each of said cavities for a corresponding each one of said holes in said cylindrical surface of said cylinder-shaped member, and with each one of said plurality of hemispherically-configurated cavities disposed rearward of its corresponding hole in said cylindrical surface of said cylinder-shaped member, and also with said center shaft so disposed that it abuts said spring with its first end and also simultaneously abuts said cylinder-shaped member with its body portion;
         (d) a plurality of ball bearings, with one ball bearing for each hole in said cylindrical surface of said cylinder-shaped member, selectively capturable within, and between, said holes in said cylindrical surface of said cylinder-shaped member and said corresponding cavities in said body portion of said center shaft;
         (e) a push button means for selectively urging and moving said center shaft slidably forward and rearward within said cylinder-shaped member, with this push button means disposed at the second end of said center shaft, and in contact therewith, wherein this push button means includes a push button actuating member, whereby when said center shaft is selectively urged and moved slidably forward of said push button actuating member, said plurality of ball bearings are releasably captured within and between said holes in said cylindrical surface of said cylinder-shaped member and said corresponding cavities in said body portion of said center shaft, and whereby when said push button means is released said ball bearings are caused to protrude from said holes in said cylindrical surface of said cylinder-shaped member, and thereby also causing said snap/lock pin to lock said wheel member to said hub member;
         (f) and, means for grasping and holding said snap/lock pin, with this grasping and holding means integrated with said cylinder-shaped member, whereby said snap/lock pin may be grasped, held, and removably inserted into its respective and corresponding hole both in said first plurality of snap/lock pin holes in a outer protruding hub portion of said wheel member, and also in a second plurality of snap/lock pin holes in said hub member;

(2) said first plurality of corresponding complementing snap/lock pin holes being such that each hole receives one of said snap/lock pins in said outer protruding hub portion of said wheel member;

(3) and, said second plurality of corresponding complementary snap/lock pin holes being such that each hole receives one of said snap/lock pins in said hub member, wherein said first and second plurality of holes are in registration;

e. and, means for breaking a seal that may develop, between said inner hollow hub portion of said wheel member and said abutting hub member, as a result of releasably connecting said wheel member and said hub member with said releasable connecting means.

2. A wheel assembly, as set forth in claim 1, wherein said means for breaking any seal that develops between said inner hollow hub portion of said wheel member and said abutting hub member, comprises a plurality of break-seal subassemblies disposed on and affixed to said outer protruding hub portion of said wheel member, wherein each one of said seal-break subassemblies includes:

a. a pair of pivot pin holders aligned with each other and in equal spaced-apart relationship, with said pin holders affixed to said outer protruding hub portion of said wheel member;

b. a slot in and through said outer protruding hub portion of said wheel member, with said slot located between said pair of pivot pin holders;

c. a rotatable pivot pin connected to and interconnecting, said pivot pin holders;

d. and, a "V"-shaped lever member having two converging legs intersecting at an apex, with said lever pivotally mounted on said pivot pin and disposed opposite said slot, and with said apex of said lever member selectively movable into and out of said slot, and also with said lever member so dimensioned that, when said apex is moved into said slot, said apex contacts, urges, and moves said abutting hub member away said inner hollow hub portion of said wheel members away from each other, and thereby breaks any seal that has developed between said inner hollow hub portion of said wheel member and said abutting hub member.

3. A wheel assembly, as set forth in claim 2, wherein:

a. said plurality of guide pins projecting outwardly from said hub member are tapered outwardly, are two in number, and are disposed in mutually opposed spaced-apart relationship;

b. said means for grasping and holding each of said plurality of snap/lock pin includes, for each pin, a fingergrip in the shape of an inverted frustum of a cone that is disposed near, and is affixed to, said open end portion of said cylinder-shaped member of said pin, with said frustrum of a cone surrounding, and extending beyond, said push button actuating member of said push button means;

c. and, said plurality of break-seal subassemblies are two in number, and are disposed in mutually opposed spaced-apart relationship.

4. A wheel assembly, as set forth in claim 3, wherein said wheel member is made of a material, and said hub member is made of a more dense material, and wherein said wheel member and said hub member are so dimensioned with relationship to each other that said hub member, because of the more dense material from which it is made, is significantly heavier than said wheel member.

* * * * *